United States Patent [19]

Williams

[11] 4,380,214

[45] Apr. 19, 1983

[54] FEED GATE FOR POULTRY CONVEYOR FEEDERS AND THE LIKE

[75] Inventor: William R. Williams, Roswell, Ga.

[73] Assignee: U.S. Industries, Inc., New York, N.Y.

[21] Appl. No.: 226,414

[22] Filed: Jan. 19, 1981

[51] Int. Cl.³ .............................................. A01K 39/01
[52] U.S. Cl. .......................... 119/51 CF; 119/52 AF; 119/53
[58] Field of Search ................. 119/52 AF, 53, 51.11, 119/56, 51 CF; 222/314, 559, 561; 221/251

[56] References Cited

U.S. PATENT DOCUMENTS

| | | | |
|---|---|---|---|
| 545,673 | 9/1895 | Burke | 119/53 |
| 2,591,609 | 4/1952 | Roberts et al. | 119/52 AF |
| 2,785,792 | 3/1957 | Cordis | 119/52 AF |
| 3,444,986 | 5/1969 | Van Huis | 119/52 AF X |

OTHER PUBLICATIONS

Big Dutchman Instruction Manual No. 10-BK-0005, 4/79 WK Revised.

Primary Examiner—Hugh R. Chamblee
Attorney, Agent, or Firm—Price, Heneveld, Huizenga & Cooper

[57] ABSTRACT

A feed gate arrangement is provided for the feeder units of automated poultry feed systems and the like, of the type having at least one feed conveyor with a moving feed carrier, such as an endless drag chain, conveyor belt, or similar structure. The feeder unit includes a housing through which the conveyor chain translates, and a mechanism to add fresh, make-up feed to the conveyor chain. The feed gate comprises a valve plate slidably mounted for vertical movement in an outlet trough of the housing, and meters the flow of feed onto the underpassing conveyor chain. The valve plate includes a laterally extending adjustment tab, which overlies an exterior surface of the housing, and is detachably anchored thereto at various vertical positions for adjusting the conveyor feed level from the exterior of the feeder unit.

12 Claims, 7 Drawing Figures

FEED GATE FOR POULTRY CONVEYOR FEEDERS AND THE LIKE

CROSS REFERENCE TO RELATED APPLICATIONS

The present application is related to my copending U.S. patent application Ser. No. 226,352, filed Jan. 19, 1981, entitled LOW PROFILE MULTI-TIER, AUTOMATED, POULTRY CAGE FEEDER SYSTEM (P-470), which is hereby incorporated by reference.

BACKGROUND OF THE INVENTION

This invention relates to automated animal feed systems, and in particular to a feed gate arrangement for make-up feeder units, such as corner hoppers, and the like.

Feeder units are used in conjunction with automated animal feed systems, such as for poultry and the like, and add fresh, make-up feed to the conveyor. One type of feeder unit is designed to be located at a corner of the conveyor, such as the mechanism disclosed in Big Dutchman Instruction Manual No. 10-BK-0005, which is hereby incorporated by reference, and is referred to in the trade as a "corner hopper".

Such corner hoppers include an inclined receptacle with a remix wheel or sprocket mounted in the base thereof, which meters additional feed onto the conveyor chain. A sluice-type feed gate is mounted in the outlet trough of the conveyor, and selectively controls the level of feed on the conveyor chain, in accordance with the length of the conveyor, and the rate at which the feed is being consumed.

Heretofore, feed gates have been mounted on the interior of the corner hopper housing, adjacent to the chain drive sprocket as shown in FIGS. 1, 16 and on page 10 of the aforementioned Big Dutchman Instruction Manual No. 10-BL-0005. Hence, to adjust feed level on the conveyor chain, the user is required to bodily remove the housing cover, loosen the wing nut on the interior plate of the housing, and then adjust the position of the gate. The housing cover plates are sometimes lost or misplaced, thereby permitting foreign objects to enter into the corner hopper and damage the unit. Further, the failure of the user to promptly replace the housing cover can possibly create a safety hazard, as can the proximity of the adjustment wing nut to the drive sprocket, and the tendency of users to adjust the feed gate when the conveyor is operating, even though such procedures are not recommended and even proscribed.

SUMMARY OF THE INVENTION

One aspect of the present invention is to provide a feed gate arrangement for feeder units in automated poultry systems, which include a sluice-type valve plate having a laterally extending adjustment tab which overlies an exterior surface of the housing, and is detachably anchored thereto to vary the vertical position of the conveyor feed level from the exterior of the feeder unit.

The feed gate arrangement can be quickly, easily and accurately adjusted, even when the conveyor is in operation. Further, the operator need not remove the conveyor chain drive cover to adjust feed level, thereby alleviating the likelihood of misplacing the cover and helping to prevent foreign objects from entering into the conveyor. The feed gate arrangement is safe to operate, relatively inexpensive to manufacture, and capable of a long operating life.

A stop and detent arrangement positively retains the feed gate in a selected position, and functions as a visual indicator for the feed level setting.

These and other features, advantages and objects of the present invention will be further understood and appreciated by those skilled in the art by reference to the following written specification, claims and appended drawings.

DETAILED DESCRIPTION OF THE PREFERRED EMBODIMENTS

Figure 1:
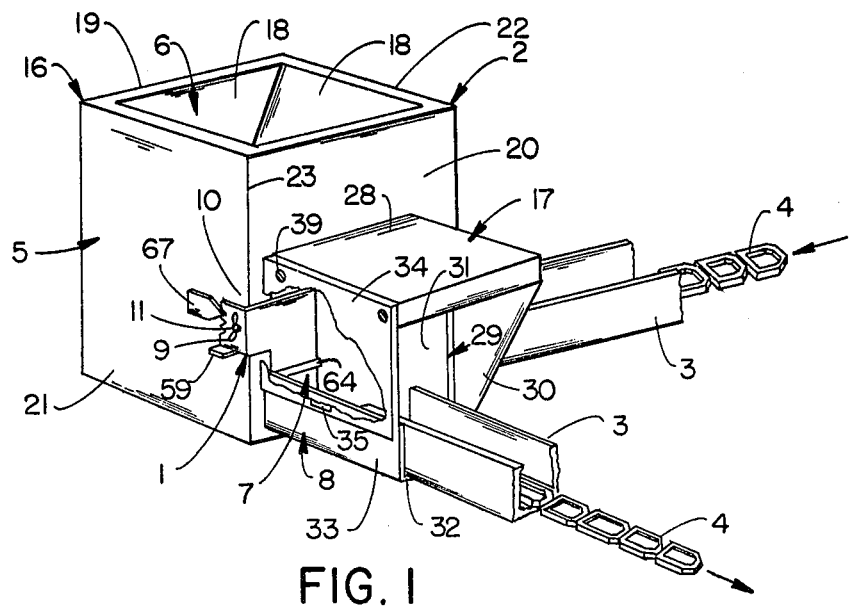
FIG. 1 is a perspective view of a corner hopper with a portion thereof broken away to reveal a feed gate arrangement therefor embodying the present invention.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a feed gate arrangement embodying the present invention, which is adapted for use in feeder units 2 for automated poultry systems of the type having at least one feed conveyor 3 with a moving carrier therein, such as feed chain 4. Feeder unit 2 includes a housing 5 through which conveyor chain 4 translates, and a hopper mechanism 6 to add fresh, make-up feed to the conveyor chain. The feed gate arrangement 1 comprises a valve plate 7 slidably mounted for vertical movement in an outlet trough of housing 5, and is disposed downstream of hopper mechanism 6. Valve plate 7 meters the flow of feed onto the underpassing conveyor chain 4, and includes a laterally extending adjustment tab 9, which overlies an exterior surface 10 of housing 5, and is detachably anchored thereto by a fastener 11 for adjusting the conveyor feed level from the exterior of feeder unit 2.

The illustrated feeder unit 2 comprises a corner hopper which is substantially identical with that disclosed in my copending United States patent application filed Jan. 19, 1981, Ser. No. 226,352, entitled LOW PROFILE AUTOMATED POULTRY CAGE FEEDER SYSTEM, which has been incorporated by reference. However, it is to be understood that feed gate arrangement 1 may be used in conjunction with other types of feeder units, including those designed to be positioned between the corners of the feed conveyor.

In this example, the housing 5 (FIG. 1) of corner hopper 2 includes two portions 16 and 17 disposed on the inlet and outlet sides respectively of corner hopper 2. Inlet housing 16 has hopper mechanism 6 therein, and includes downwardly inclined walls 18 which direct feed onto a remix wheel (not shown) rotatably mounted in a pocket at the base of the hopper walls 18. The remix wheel (not shown) dispenses fresh, make-up feed from hopper 6 onto conveyor chain 4 at a location disposed upstream of feed gate 1.

Inlet housing 16 further includes a pair of sidewalls 19 and 20, and end walls 21 and 22 which are interconnected in a generally rectangular configuration. End wall 21 is adapted to be positioned facing the exterior side of the feed system, and forms a corner 23 along its inward edge at the intersection with sidewall 20. Housing sidewall 20 further includes a rectangular opening 24 (FIG. 2) at the lower forward edge of the wall, through which conveyor chain 4 translates on the outlet side of corner hopper 1, as will be described in greater detail hereinafter.

Figure 5:
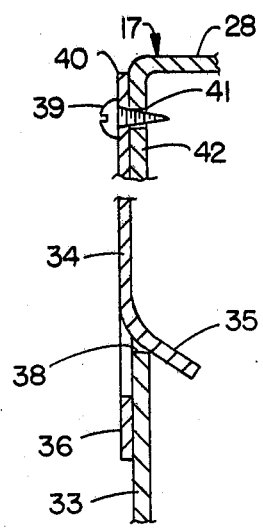
FIG. 5 is a fragmentary, vertical cross-sectional view through the cover plate.
Figure 6:
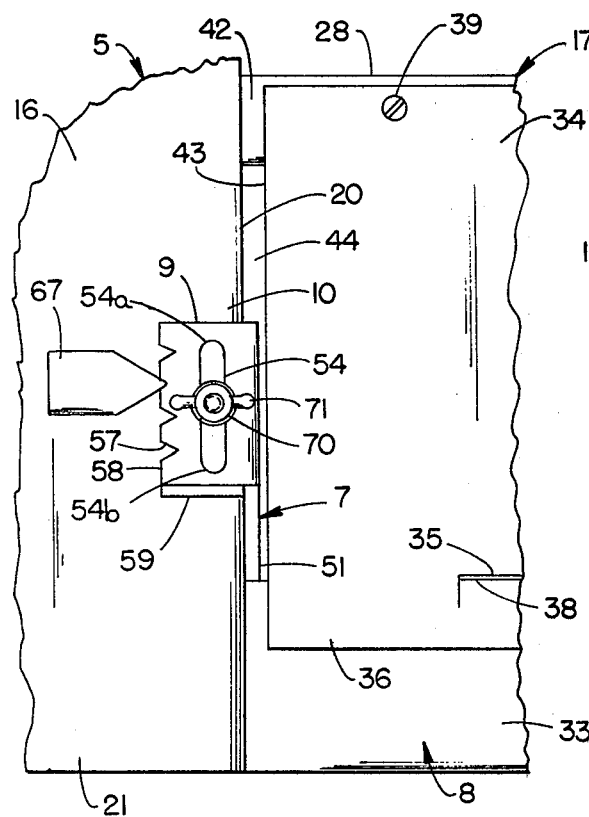
FIG. 6 is a fragmentary, side elevational view of the corner hopper, shown with the feed gate anchored in a selected vertical position.
Figure 7:
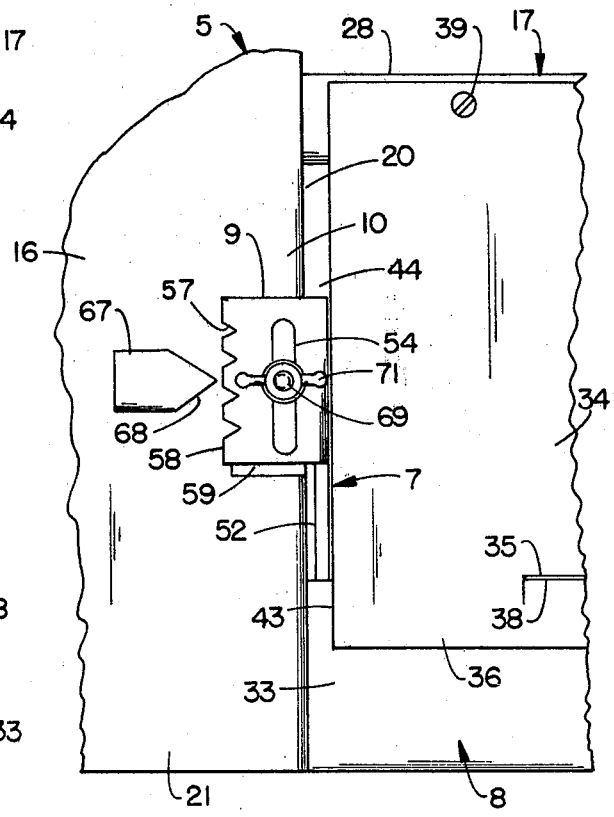
FIG. 7 is a fragmentary, side elevational view of the corner hopper, with the feed gate shown in an unanchored position for shifting the same to an alternate vertical setting.

The outlet side 17 of housing 5 extends inwardly, or to the right from housing sidewall 20, and in the illustrated example is set back slightly from the plane of forward end wall 21. Outlet housing 17 includes an upper plate 28 having a J-shaped channel 29 disposed near the forward edge of plate 28, and a triangular gusset 30 positioned at the outer end of housing 17 to securely interconnect upper plate 28 with channel 29. Channel 29 includes a rear wall 31, a base 32, and a front wall 33, which define outlet trough 8, and extend along the adjacent housing edges which form outlet opening 24 so that outlet trough 8 is longitudinally aligned and centered therewith. A chair drive sprocket (not shown) is mounted in outlet trough 8 at a location downstream of feed gate 1, and translates conveyor chain 4. A removable cover plate 34 extends between the upper edge of trough wall 33 and housing plate 28 to close the front of outlet housing 17. With reference to FIG. 5, in this example, cover plate 34 includes a rearwardly bent tab 35 adjacent the lower edge 36 of cover plate 34, which engages the upper edge 38 of trough wall 33. Suitable fasteners, such as sheet metal screws 39, extend along the upper edge 40 of cover plate 34, and into mating apertures 41 in a depending, apron portion 42 of upper plate 28, thereby securely interconnecting cover plate 34 with outlet housing 17. The lower edge 36 of cover plate 34 laps over trough edge 34 and presents a very neat appearance. Cover plate 34 can be easily removed from outlet housing 17 to access the conveyor chain drive (not shown) by simply removing screws 38, and lifting cover plate 34 upwardly and outwardly, so that tab 35 disengages sidewall edge 38. As best illustrated in FIGS. 6 and 7, the left hand side edge 43 at cover plate 34 is spaced from housing wall 20 to form a gap 44 therebetween, having a width sufficient to permit feed gate 1 to translate laterally during feed gate adjustment, as discussed below. In this example, gap 44 has a width in the nature of ¼ inch.

Figures 2, 3:
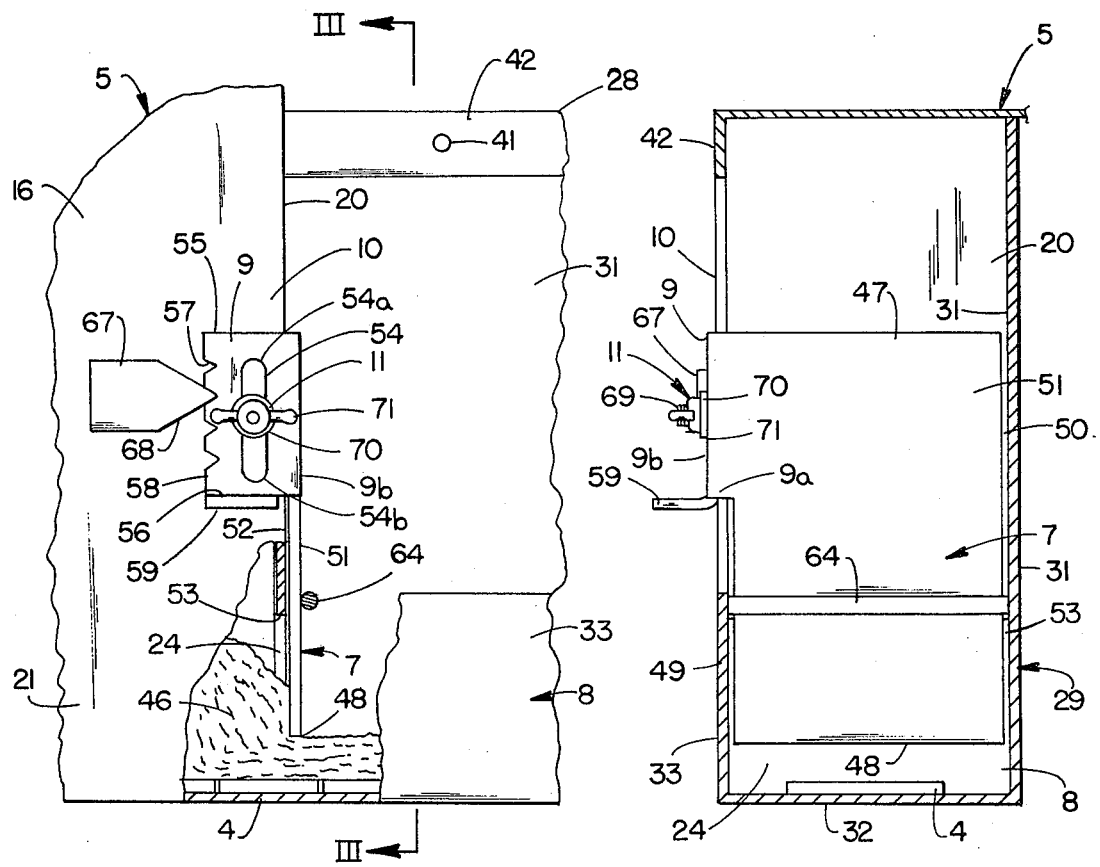
FIG. 2 is a side elevational view of the corner hopper, with the cover plate removed, and portions thereof broken away to reveal the feed gate.
FIG. 3 is a fragmentary, vertical cross-sectional view of the corner hopper with removed cover plate, taken along line III—III of FIG. 2.
Figure 4:
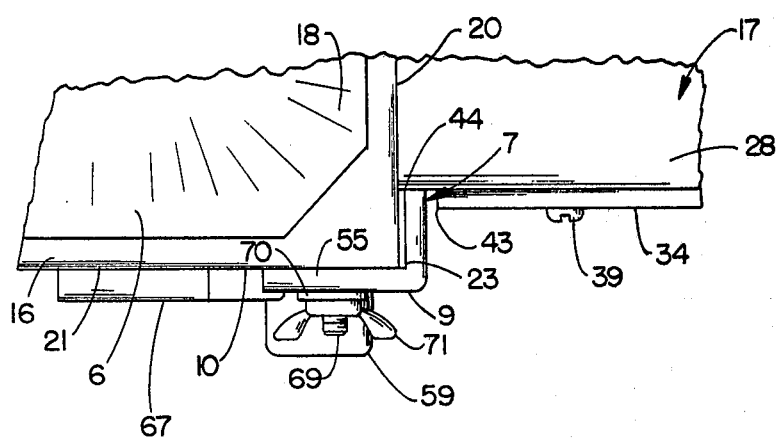
FIG. 4 is a fragmentary, top plan view of the corner feeder.

With reference to FIGS. 1–3, the valve plate portion 7 of feed gate 1 has a generally rectangular plan shape, with an upper edge 47, a lower edge 48, a forward side edge 49, and a rearward side edge 50. Valve plate 7 has substantially flat, coplanar exterior and interior surfaces 51 and 52 respectively, and is rigid. The valve plate side edges 49 and 50 are parallel with, and adjacent to housing sidewalls 33 and 29 respectively, so as to control the size of the gate opening by raising and lowering valve plate 7. The lower edge 48 of valve plate 7 extends below the upper edge 53 of outlet opening 24, so as to restrict the flow of feed 46 flowing through outlet opening 24 to a preselected height above conveyor chain 4.

Adjustment tab 9 extends laterally from valve plate 7 (to the left as viewed in FIGS. 1 and 2) and is integrally connected therewith so that valve plate 7 and tab 9 move together. In this example, adjustment tab 9 has a generally rectangular shape, with a neck 9a which extends through the gap 44 (FIGS. 6 and 7) between housing wall 20 and cover plate edge 43. Tab neck 9a is bent along corner edge 9b at an angle perpendicular to plate 7 to extend around housing corner 23, and the body of tab 9 overlies the exterior surface 10 of forward housing sidewall 21. Adjustment tab 9 includes an enlongate slot 54 which extends along the longitudinal axis of the adjustment tab body in a substantially vertical orientation. Slot 54 receives fastener 11 therethrough, and has a length which extends adjacent to the upper and lower ends 54 and 55 respectively of tab 9. The upper end 54a of slot 54 is located in tab 9 so as to prevent the bottom edge 48 of valve plate 7 from engaging conveyor chain 4. The lower end 54b of slot 54 is positioned in tab 9 at a location which prevents valve plate 7 from being inadvertently withdrawn from behind mounting bar 64. A plurality of spaced apart detents 57 are provided along the left-hand edge 58 of tab 9 for purposes to be described in greater detail hereinafter. Further, a lip 59 extends outwardly from the lower end 56 of tab 9 in a substantially perpendicular orientation thereto, and is shaped to be grasped for manually moving feed gate 1 between various vertical positions.

Feed gate 1 is mounted at the entrance of outlet trough 8 for sliding translation therein along a substantially vertical plane. In this example, rigid bar 64 extends transversely between outlet trough sidewalls 31 and 33 at an elevation slightly above the upper edge 53 of housing outlet opening 24. Bar 64 extends along a substantially horizontal plane, and has its ends welded or otherwise suitably secured to the interior sides of outlet sidewalls 31 and 33. Bar 64 is spaced downstream from the exterior surface of housing wall 20 a distance slightly greater than the thickness of feed gate plate 7 to form a space or slot in which feed gate 1 is inserted and slidingly retained.

The vertical position of feed gate 1 is positively retained in a preselected vertical position by a stop 67. Stop 67 is fixedly attached to the forward housing sidewall 21, and includes a wedge-shaped end 68 which is shaped to be matingly received in detents 57. Fastener 11 comprises a threaded stud or bolt 69 with its interior end anchored fixedly in housing sidewall 21. The shank of bolt 69 extends through tab slot 54, and a washer 70 and wing nut 71 are attached to the terminal end of bolt 69. During operation, adjustment tab 9 is positioned on housing 5 so that stop 67 engages one of detents 57, and wing nut 71 is then tightened, so as to securely maintain engagement between stop 67 and adjustment tab 9 and thereby positively lock feed gate 1 in place.

Tab slot 54 has a width which is substantially greater than the diameter of fastener bolt 69, so that when wing nut 71 is loosened, tab 9 can be moved laterally to the right, as shown in FIG. 7, to disengage the tab detents 57 from stop 67, and vertically reposition feed gate 1 at a new height. When the new gate height has been reached, tab 9 is shifted back laterally to the left, as shown in FIG. 6, so that a different detent 57 engages stop 67, and wing nut 71 is then retightened. The gap 44 between housing sidewall 20 and the left-hand edge 43 of cover plate 34 permits feed gate 1 to be shifted laterally for vertical adjustment. The slot between housing wall 20 and support bar 64 is similarly enlarged to permit some lateral shifting of valve plate 7. Further, the upper, tab end 9 of feed gate 1 can be pivoted slightly in the gap formed by support bar 64 to achieve additional lateral movement to move detents 57 and stop end 68 into and out of engagement or registry.

In use, feed gate 1 is adjusted by simply loosening wing nut 71, grasping lip 59, and moving the upper end of the feed gate laterally to the right so that stop 67 disengages the associated detent 57. Feed gate 1 is then raised or lowered to the desired level, and shifted back to the left so that stop 67 engages a horizontally aligned one of the tab detents 57. Next, wing nut 71 is tightened to securely anchor feed gate 1 in place. The engagement of stop 67 with one of the detents 57 on tab 9 not only provides a positive anchoring of feed plate 1 with respect to the corner hopper housing 5, but also provides a visual indication of the level setting of feed gate 1 which is readily ascertainable from a quick glance at the front of corner hopper 2.

The present feed gate arrangement 1 quickly, easily, and accurately adjusts the flow of feed onto conveyor chain 4, and is manipulated from the exterior of the corner feeder 2. Since cover plate 34 need not be removed to effect feed gate adjustment, those disadvantages associated with leaving the cover plate off of the housing are greatly alleviated, if not eliminated. The detented adjustment tab and wedge-shaped stop not only positively anchor the feed gate in a preselected vertical position, but also provide a visual indicator for the feed gate setting.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a feeder unit for automated poultry systems and the like of the type having at least one feed conveyor with a moving feed carrier; said feeder unit comprising a housing through which said feed carrier translates, means for adding feed to a return area of said feed carrier, and an outlet trough disposed downstream of said feed adding means, the improvement of an adjustable feed gate comprising:
    a valve plate having means for slidably mounting the same in said outlet trough for translation along a generally vertical plane; said valve plate having a lower, free edge disposed a preselected distance from the feed carrier in said output trough for metering the flow of feed from said feed adding means onto said feed carrier;
    an adjustment tab attached to and moving with said valve plate; said adjustment tab extending laterally from said valve plate, and overlying an exterior surface of said feeder unit housing;
    means for detachably anchoring said adjustment tab to said housing at selected vertical positions for varying the conveyor feed level from the exterior of said feeder unit; said anchoring means comprising:
        a plurality of detents spaced along a side edge of said adjustment tab; and
        a stop fixedly attached to said housing and having a portion thereof shaped for mating reception in said detents, whereby said stop in conjunction with said adjustment tab detents both indicates the level setting of said feed gate, and interconnects said plate with said housing.

2. A feeder unit as set forth in claim 1, wherein:
said housing includes an inlet side in which said feed adding means is disposed, and an outlet side in which said outlet trough is disposed, and which includes a drive unit for powering said feed carrier;
said housing outlet side includes a removable cover to access said drive unit; and
said adjustment tab extends alongside said cover, whereby said plate is adjustable without removing said cover.

3. A feeder unit as set forth in claim 1, wherein:
said adjustment tab includes an outwardly extending lip adapted for grasping to move said plate.

4. A feeder unit as set forth in claim 1, wherein:
said feeder unit comprises a corner hopper.

5. A feeder unit as set forth in claim 1, wherein said detachable anchoring means further comprises:
an elongate slot disposed in said adjustment tab; and
a threaded fastener mounted in said housing and having a portion thereof extending through said tab slot, with a nut disposed on that portion of said fastener which projects from said tab slot.

6. A feeder unit as set forth in claim 5, wherein said plate mounting means comprises:
a bar attached to and extending transversely across said outlet trough at a position adjacent the lower edge of said valve plate on the downstream side thereof for retaining said plate in a vertical orientation.

7. A feeder unit as set forth in claim 6, wherein said tab slot has a length which prevents said valve plate lower edge from engaging said feed carrier, and prevents said valve plate from being inadvertently withdrawn from behind said bar.

8. A corner feeder as set forth in claim 7, wherein:
said housing includes an inlet side in which said feed adding means is disposed, and an outlet side in which said outlet trough is disposed, and which includes a drive unit for powering said feed carrier;
said housing outlet side includes a removable cover to access said drive unit; and
said adjustment tab extends alongside said cover, whereby said plate is adjustable without removing said cover.

9. A corner feeder as set forth in claim 8, wherein:
said adjustment tab includes an outwardly extending lip adapted for grasping to move said plate.

10. A corner feeder as set forth in claim 9, wherein:
said feeder unit comprises a corner hopper.

11. A feeder unit as set forth in claim 1, wherein said plate mounting means comprises:
a bar attached to and extending transversely across said outlet trough at a position adjacent the lower edge of said valve plate on the downstream side thereof for retaining said plate in a vertical orientation.

12. A feeder unit as set forth in claim 11, wherein:
said tab slot has a length which prevents said valve plate lower edge from engaging said feed carrier, and prevents said valve plate from being inadvertently withdrawn from behind said bar.

* * * * *